Oct. 15, 1935.   F. W. FUNKE   2,017,454
TORCH
Filed Dec. 14, 1932

Witnesses:

Inventor:

Patented Oct. 15, 1935

2,017,454

UNITED STATES PATENT OFFICE 2,017,454

TORCH

Fred W. Funke, Oakland, Calif.; dedicated to the free use of the Public

Application December 14, 1932, Serial No. 647,146

3 Claims. (Cl. 158—42.1)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the public, in the territory of the United States, to take effect upon the granting of a patent to me.

This invention relates to improvements in fire fighting tools and has for its object an implement in the form of a torch of the non-generating type using cold fuel and particularly adapted for the purpose of setting back fires in the suppression of forest fires, and the like. The device operates as a flame thrower and is equipped with a fuel spray pump (not shown). Back-firing torches have been valuable tools for fire suppression work for many years. This implement accomplishes the results desired in a manner extremely helpful in fire fighting work.

Figure 1:
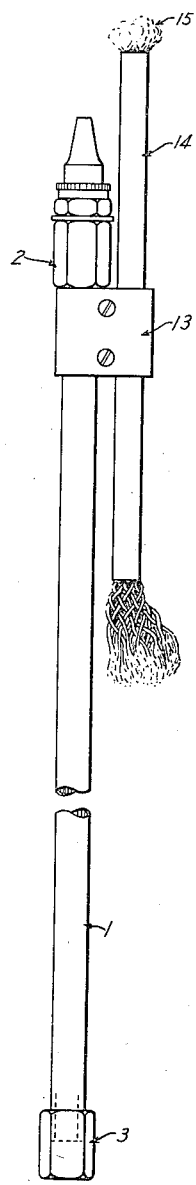
Figure 2:
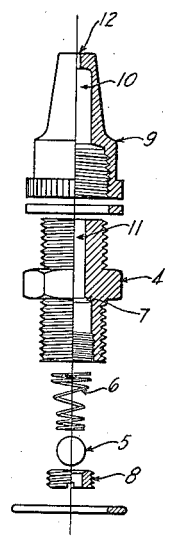

In the accompanying drawing Figure 1 is a side elevation of the assembled device; Figure 2 is a detailed view of the nozzle, turbulence chambers, orifice, and check valve assembly.

Similar numerals refer to similar parts throughout the several views.

In carrying out the invention I provide a metallic tube 1 to which is attached at each end an adapter 2, 3. The adapter 3 serves as a coupling between the device and a source of fuel oil and pressure (not shown). To the adapter 2 which is threaded on the inside, is attached the fitting or hollow threaded coupling 4. Within the fitting 4 is placed a self closing check valve of the ball and spring type. One end of the spring 6 rests upon a shoulder 7 formed within the fitting 4 and the other end comes into contact with the ball 5. The ball in turn bears tightly upon the fitted rim of the hollow fitting 8 which is threaded on the outside so as to screw into fitting 4 which is threaded on the inside. The parts are assembled so as to contract the spring 6. To the fitting 4 at the end opposite the check valve is attached the nozzle 9 which is threaded on the inside to receive the threaded coupling 4 and which contains the turbulence chamber 10. This chamber extends from the point reached by the fitting 4 in the assembled device to a point short of the end of the nozzle and is somewhat larger than the adjoining chamber 11 in the fitting 4. A small orifice 12 extends from the turbulence chamber 10 to the end of the nozzle. Clamped to the tube 1 is an attachment plate 13 to which is affixed an igniter tube 14. A taper 15 projects from the forward end of the igniter tube. The igniter tube 14 is attached to the tube 1 by means of the plate 13 so that the taper 15 is located in the assembled device just beyond the end of the nozzle and substantially parallel to it.

The operation of the unit provides for fuel oils of the non-explosive grade to be fed by pressure through a hand type pump not shown, through the tube 1, the taper 15 having been saturated with fuel and ignited. The force stroke of the pump forces the fuel around and over the check valve ball 5 and through the mesh of the compressed spring 6, causing a high degree of turbulence. Further agitation is induced by passing the oil through the chamber 11 to the chamber 10, where expansion of the fluid body forces the agitated fuel to the wall of the chamber permitting a lightly agitated stream of fuel to pass through the orifice 12. The frictional contact of the agitated fuel in the chamber 10, with the small stream of fuel passing through the orifice 12, causes the fuel stream projected to be highly aerated along its outer wall while passing a solid stream of fuel through the aerated section. The aerated fuel is ignited by the taper at a point approximately one inch from the orifice. The aerated wall of fuel having been ignited, carries the flame to the solid stream of fuel which, when it loses velocity and breaks from air resistance at a point approximately 12 feet from the orifice develops an intense heat and flame igniting the material against which it is directed. A large portion of the fuel reaching the object unburned spreads fire along the ground. The check valve permits fuel to pass under pressure only causing a quick cutoff of fuel when pressure is reduced, insuring safety in operation as well as maintaining pressure necessary to proper turbulence of the stream.

It is apparent that slight changes may be made in the construction of the device without departing from the spirit of the invention. The adapters 2, 3 and the tube 1 may, of course, be altered to make the implement adaptable to any type of pressure source and for purposes other than those of fighting fires.

Having fully disclosed my discovery, I claim as my invention:

1. A flame-throwing torch adapted to the use of cold fuel oil comprising a nozzle having a turbulence chamber and orifice, a hollow coupling attached to said nozzle and having a chamber smaller than the first mentioned chamber, the said chambers being adjacent to each other in the assembled device, whereby a solid stream of fuel oil surrounded along its outer wall by a highly aerated section of fuel oil, is projected from the nozzle, means to convey cold fuel oil under pressure to said chambers and nozzle, means to automatically stop the flow of fuel oil when the pressure is terminated and means to ignite the aerated oil as it passes from the orifice of said nozzle.

2. A torch adapted to the use of cold fuel oil under pressure comprising a nozzle having a turbulence chamber and orifice, a hollow coupling attached to said nozzle and having a chamber smaller than the first mentioned chamber, the said chambers being adjacent to each other in the assembled device, whereby the fuel oil stream projected from the nozzle is highly aerated along its outer wall with a solid stream of fuel oil through the aerated section, a ball and spring check valve positioned within said hollow coupling to terminate the flow of fuel oil when pressure is relieved, an oil conveying tube attached to said hollow coupling at the end opposite the nozzle, an igniter tube associated with said first mentioned tube and one end of which extends slightly beyond the free end of the nozzle and a taper projecting from the forward end of the igniter tube.

3. In a flame-throwing torch adapted to the use of cold fuel oil of a non-explosive type and having an oil conveyer tube adapted at one end to be attached to a source of oil under pressure, automatic check valve means to stop the flow of oil when pressure is terminated and oil-igniter means attached to said tube; a nozzle having a turbulence chamber and outlet orifice, a hollow coupling connecting the nozzle and said tube at the other end of the tube, said hollow coupling having a chamber smaller than the turbulence chamber, the two chambers being adjacent to each other in the assembled device, whereby a solid stream of fuel oil surrounded along its outer wall by a highly aerated section of fuel oil is projected from the nozzle and the outlet orifice of the nozzle being in close proximity to the igniter means.

FRED W. FUNKE.